(12) United States Patent
Lee et al.

(10) Patent No.: US 12,433,503 B2
(45) Date of Patent: Oct. 7, 2025

(54) SYSTEMS AND METHODS OF CORRECTING EFFECTS OF SECOND-ORDER CONCOMITANT FIELDS IN A MAGNETIC RESONANCE SYSTEM WITH A SECOND-ORDER CORRECTION COIL ASSEMBLY

(71) Applicant: GE PRECISION HEALTHCARE LLC, Wauwatosa, WI (US)

(72) Inventors: Seung-Kyun Lee, Cohoes, NY (US); Afis Ajala, Schenectady, NY (US); Thomas Kwok-Fah Foo, Clifton Park, NY (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 106 days.

(21) Appl. No.: 18/156,144

(22) Filed: Jan. 18, 2023

(65) Prior Publication Data
US 2024/0237910 A1    Jul. 18, 2024

(51) Int. Cl.
*G01R 33/565* (2006.01)
*A61B 5/055* (2006.01)
(Continued)

(52) U.S. Cl.
CPC .......... *A61B 5/055* (2013.01); *G01R 33/385* (2013.01); *G01R 33/3875* (2013.01);
(Continued)

(58) Field of Classification Search
CPC .. A61B 5/055; G01R 33/385; G01R 33/3875; G01R 33/56554; G01R 33/56581; G01R 33/389
See application file for complete search history.

(56) References Cited

U.S. PATENT DOCUMENTS 10,613,174 B2    4/2020    Bhat
10,712,420 B2    7/2020    Shengzhen et al.
(Continued)

FOREIGN PATENT DOCUMENTS

EP         3304098 A1      4/2018
WO   WO-2012138902 A1 * 10/2012   ......... G01R 33/3875
(Continued)

OTHER PUBLICATIONS

Abad et al.,. "Brain Microstructure Imaging with Ultrahigh B-Encoding using Magnus High Performance Gradients", in ISMRM 2022 Annual Proceedings (2022).
(Continued)

*Primary Examiner* — Rishi R Patel
(74) *Attorney, Agent, or Firm* — Armstrong Teasdale LLP

(57) ABSTRACT

A magnetic resonance (MR) system for correcting concomitant field effects is provided. The MR system includes a gradient coil assembly including a plurality of gradient coils configured to apply at least one gradient field to a polarizing magnetic field of the MR system. The MR system also includes a second-order correction coil assembly including a first second-order correction coil configured to correct effects of a first term of second-order concomitant fields generated by the at least one gradient field. The system further includes a second-order correction computing device including at least one processor in communication with at least one memory device. The at least one processor is programmed to control the second-order correction coil assembly by instructing the MR system to apply a compensation field to the second-order correction coil assembly asynchronously with the at least one gradient field.

19 Claims, 15 Drawing Sheets

(51) Int. Cl.
    G01R 33/385     (2006.01)
    G01R 33/3875    (2006.01)
    G01R 33/389     (2006.01)
(52) U.S. Cl.
    CPC .  G01R 33/56554 (2013.01); G01R 33/56581 (2013.01); *G01R 33/389* (2013.01)

(56) References Cited

U.S. PATENT DOCUMENTS

| | | | |
|---|---|---|---|
| 11,243,287 | B2 | 2/2022 | Harris |
| 11,294,016 | B1 | 4/2022 | Foo |
| 2009/0309596 | A1* | 12/2009 | Feiweier ............... G01R 33/385 324/313 |
| 2013/0057281 | A1* | 3/2013 | Feiweier ................ A61B 5/055 324/309 |
| 2018/0203088 | A1 | 7/2018 | Tao et al. |
| 2021/0103022 | A1* | 4/2021 | Harris ................ G01R 33/3875 |
| 2021/0149003 | A1* | 5/2021 | Wang ................ G01R 33/3875 |
| 2021/0166447 | A1 | 6/2021 | Koerzdoerfer |
| 2022/0357416 | A1* | 11/2022 | Mugler, III ........ G01R 33/5617 |
| 2023/0095599 | A1 | 3/2023 | Roberts |
| 2023/0358836 | A1* | 11/2023 | Setsompop ........ G01R 33/5607 |

FOREIGN PATENT DOCUMENTS

| | | |
|---|---|---|
| WO | 2016180983 A1 | 11/2016 |
| WO | 2016196103 A1 | 12/2016 |

OTHER PUBLICATIONS

Abad et al., Calibration of concomitant field offsets using phase-contrast MRI for asymmetric gradient coils, Magn Reson Med. Jan. 2023; 89(1):262-275. doi: 10.1002/mrm.29452. Epub Sep. 21, 2022.

Ajala et al., "3D Pseudo-Continuous Arterial Spin Labeling Acquisition using a High-Performance Gradient System: A Scan Time and Image Quality Assessment", in ISMRM 2022 Annual Proceedings (2022).

Bernstein et al., "Concomitant Gradient Terms in Phase Contrast MR: Analysis and Correction", MRM 39:300-308 (1998).

Du et al., "Correction of Concomitant Magnetic Field-Induced Image Artifacts in Nonaxial Echo-Planar Imaging" MRM 48:509-515 (2002), DOI: 10.1002/mrm.10249.

Foo et al., "Highly efficient head-only magnetic field insert gradient coil for achieving simultaneous high gradient amplitude and slew rate at 3.0T (Magnus) for brain microstructure imaging", Magnetic Resonance in Medicine 83, 2356-2369 (2019).

King et al, "Concomitant Gradient Field Effects in Spiral Scans", MRM 41:103-112 (1999).

Setsompop et al., "Pushing the limits of in vivo diffusion MRI for the Human Connectome Project", Neuroimage 80, 220-233 (2013).

Shih et al.,. "Initial Clinical Experience with Magnus Ultra-High-Performance Gradient Coil for Diffusion Microstructure Imaging of Intracranial Pathology", in ISMRM 2022 Annual Proceedings (2022).

Tao et al,. "The Effect of Concomitant Fields in Fast Spin Echo Acquisition on Asymmetric MRI Gradient Systems" Magn Reson Med 79, 1354-1364 (2018).

Tao et al., "Gradient Pre-Emphasis to Counteract First-Order Concomitant Fields on Asymmetric MRI Gradient Systems", MRM 77:2250-2262 (2017), published online Jul. 4, 2016, DOI: 10.1002/mrmt.26315.

Weavers et al., "B0 Concomitant Field Compensation for MRI Systems Employing Asymmetric Transverse Gradient Coils", MRM 79:1538-1544 (2018), published online Jun. 21, 2017, DOI: 10.1002/mrm.26790.

Weiger et al,. "A high-performance gradient insert for rapid and short-T2 imaging at full duty cycle", Magn Reson Med 79, 3256-3266 (2018).

Wilm et al., Single-Shot Spiral Imaging Enabled by an Expanded Encoding Model: Demonstration in Diffusion MRI, MRM, 77:83-91, published onine Oct. 21, 2016, DOI: 10.1002/mrm.26493.

Yudilevich et al., "Interpolation from Samples on a Linear Spiral Scan", IEEE Trans Med Imaging, 1987;6(3):193-200, doi: 10.1109/TMI.1987.4307827.

Zhou et al., "Artifacts Induced by Concomitant Magnetic Field in Fast Spin-Echo Imaging", MRM 40:582-591 (1998).

Zhu et al., "Characterizing Restricted Diffusion in Pre-/Post-treatment Gliomas Using Time-dependent Diffusion MRI at Ultra-high-gradient Human 3.0T", in ISMRM 2022 Annual Proceedings (2022).

Niu C. et al., "A Novel Active Shim Coil Design Scheme for the Effective Imaging Region above the Patient Bed in MRI", J Supercond Nov Magn 35, 1685-1691 (2022). https://doi.org/10.1007/s10948-022-06249-x.

Christoph Juchem et al., "Dynamic multi-coil shimming of the human brain at 7T", Journal of Magnetic Resonance, vol. 212, Issue 2, 2011, pp. 280-288, ISSN 1090-7807, https://doi.org/10.1016/j.jmr.2011.07.005.

Liao et al., "Flexible use of AC/DC shim array for eddy-currents and concomitant fields mitigation with demonstrated applications in diffusion-prepared acquisition and non-Cartesian sampling", in ISMRM 2023 Workshop on Data Sampling & Image Reconstruction, published Jan. 3, 2023.

\* cited by examiner

| Concomitant field terms | Generated by gradient coil | How it appears in axial, coronal, sagittal planes | Compensation strategy | HOS coil used |
|---|---|---|---|---|
| $Z^2$ | Gx or Gy | Constant (axial) | RF frequency | No HOS coil |
| | | $Z^2$ (coronal) | $(Z^2-Y^2)$ field where $Y$=const | "Z2" coil + (0.5)*"X2Y2" coil |
| | | $Z^2$ (sagittal) | $(Z^2-X^2)$ field where $X$=const | "Z2" coil - (0.5)*"X2Y2" coil |
| $X^2\,Y^2$ | Gz | $X^2+Y^2$ (axial) | $Z^2-(X^2-Y^2)/2$ where $Z$=const | "Z2" coil |
| | | $X^2$ (coronal) | $(X^2-Y^2)$ field where $Y$=const | "X2Y2" coil |
| | | $Y^2$ (sagittal) | $(X^2-Y^2)$ field where $X$=const | "X2Y2" coil |

FIG. 5B

SYSTEMS AND METHODS OF CORRECTING EFFECTS OF SECOND-ORDER CONCOMITANT FIELDS IN A MAGNETIC RESONANCE SYSTEM WITH A SECOND-ORDER CORRECTION COIL ASSEMBLY

BACKGROUND OF THE INVENTION

The field of the disclosure relates generally to systems and methods of medical imaging, and more particularly, to systems and methods of correcting effects of second-order concomitant fields in a magnetic resonance (MR) system.

Magnetic resonance imaging (MRI) has proven useful in diagnosis of many diseases. MRI provides detailed images of soft tissues, abnormal tissues such as tumors, and other structures, which cannot be readily imaged by other imaging modalities, such as computed tomography (CT). Further, MRI operates without exposing patients to ionizing radiation experienced in modalities such as CT and x-rays.

Concomitant fields generated by gradients in an MR system introduce errors in the MR signals and therefore may interfere with diagnosis. Known methods are disadvantaged in some aspects and improvements are desired.

SUMMARY OF THE INVENTION

In one aspect, a magnetic resonance (MR) system for correcting concomitant field effects is provided. The MR system includes a gradient coil assembly including a plurality of gradient coils configured to apply at least one gradient field to a polarizing magnetic field of the MR system. The MR system also includes a second-order correction coil assembly including a first second-order correction coil configured to correct effects of a first term of second-order concomitant fields generated by the at least one gradient field. The system further includes a second-order correction computing device including at least one processor in communication with at least one memory device. The at least one processor is programmed to control the second-order correction coil assembly by instructing the MR system to apply a compensation field to the second-order correction coil assembly asynchronously with the at least one gradient field.

In another aspect, a second-order correction coil assembly for correcting concomitant field effects in an MR system is provided. The second-order correction coil assembly includes a first second-order correction coil configured to correct a first term of second-order concomitant fields generated by a gradient coil assembly of an MR system, and a second second-order correction coil configured to correct a second term of the second-order concomitant fields. The second-order correction coil assembly is configured to correct a third term of the second-order concomitant fields based on a combination of the first second-order correction coil and the second second-order correction coil.

In one more aspect, a method of correcting concomitant field effects in an MR system is provided. The method includes installing a second-order correction coil assembly in an MR system, wherein the second-order correction coil assembly includes a first second-order correction coil configured to correct effects of a first term of second-order concomitant fields generated by a gradient coil assembly of the MR system. The method also includes instructing the MR system to apply a compensation field to the second-order correction coil assembly asynchronously with at least one gradient field by the gradient coil assembly.

BRIEF DESCRIPTION OF DRAWINGS

FIG. 5B is a table showing correcting effects from terms of concomitant fields using a plurality of second-order correction coils.

DETAILED DESCRIPTION

The disclosure includes systems and methods of correcting effects of concomitant fields in a magnetic resonance (MR) system with a second-order correction coil assembly. Concomitant fields introduce errors to MR signals and cause artifacts such as pixel shifts, in-plane blurring, and/or through-plane blurring in MR images of a subject. As used herein, a subject is a human, an animal, or a phantom, or part of a human, an animal, or a phantom, such as an organ or tissue. 2D acquisition is used as examples for illustration purposes only. Systems and methods described herein may be applied to 3D acquisition in correcting second-order concomitant phase errors. An MR system is described herein as an example for illustration purposes only. Systems and methods described herein may be applied to other image modalities such as PET-MR (positron emission tomography-magnetic resonance) systems. Method aspects will be in part apparent and in part explicitly discussed in the following description.

In magnetic resonance imaging (MRI), a subject is placed in a magnet. When the subject is in the magnetic field generated by the magnet, magnetic moments of nuclei, such as protons, attempt to align with the magnetic field but precess about the magnetic field in a random order at the nuclei's Larmor frequency. The magnetic field of the magnet is referred to as $B_0$ and extends in the longitudinal or z direction. In acquiring an MRI image, a magnetic field (referred to as an excitation field $B_1$), which is in the x-y plane and near the Larmor frequency, is generated by a radio-frequency (RF) coil and may be used to rotate, or "tip," the net magnetic moment Mz of the nuclei from the z direction to the transverse or x-y plane. A signal, which is referred to as an MR signal, is emitted by the nuclei, after the excitation signal $B_1$ is terminated. To use the MR signals to generate an image of a subject, magnetic field gradient pulses (Gx, Gy, and Gz) are used. The gradient pulses are used to scan through the k-space, the space of spatial frequencies or inverse of distances. A Fourier relationship exists between the acquired MR signals and an image of the subject, and therefore the image of the subject may be derived by Fourier transform of the MR signals.

Figure 1:
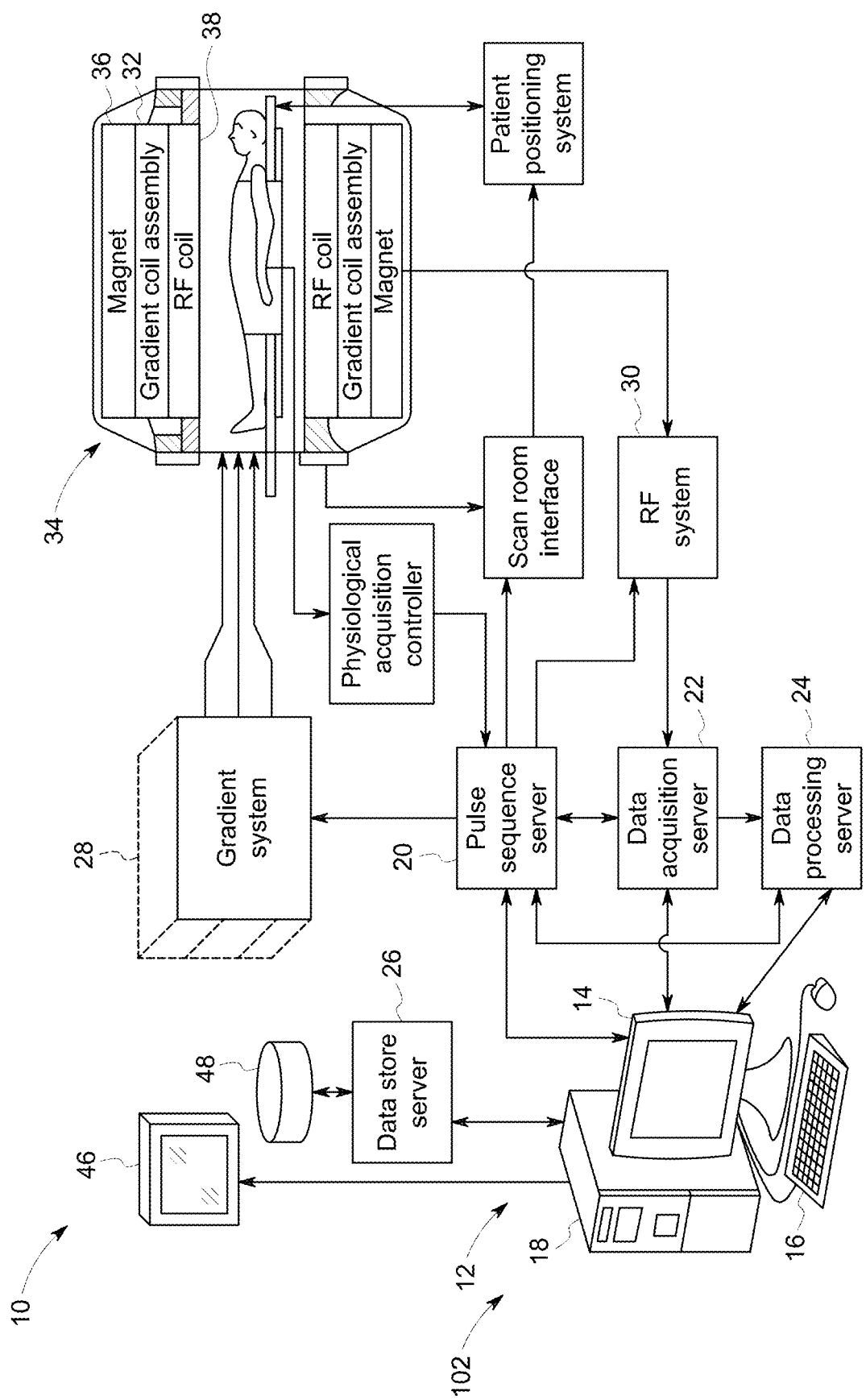
FIG. 1 is a schematic diagram of an example magnetic resonance (MR) system.

FIG. 1 illustrates a schematic diagram of an example MRI system 10. In the example embodiment, MRI system 10 includes a workstation 12 having a display 14 and a keyboard 16. Workstation 12 includes a processor 18, such as a commercially available programmable machine running a commercially available operating system. Workstation 12 provides an operator interface that allows scan prescriptions to be entered into MRI system 10. Workstation 12 is coupled to a pulse sequence server 20, a data acquisition server 22, a data processing server 24, and a data store server 26. Workstation 12 and each server 20, 22, 24, and 26 communicate with each other.

In the example embodiment, pulse sequence server 20 responds to instructions downloaded from workstation 12 to operate a gradient system 28 and a radiofrequency ("RF") system 30. The instructions are used to produce gradient and RF waveforms in MR pulse sequences. An RF coil 38 and a gradient coil assembly 32 are used to perform the prescribed MR pulse sequence. RF coil 38 is shown as a whole body RF coil. RF coil 38 may also be a local coil that may be placed in proximity to the anatomy to be imaged, or a coil array that includes a plurality of coils.

In the example embodiment, gradient waveforms used to perform the prescribed scan are produced and applied to gradient system 28, which excites gradient coils in gradient coil assembly 32 to produce the magnetic field gradients $G_x$, $G_y$, and $G_z$ used for position-encoding MR signals. Gradient coil assembly 32 forms part of a magnet assembly 34 that also includes a polarizing magnet 36 configured to generate a polarizing magnetic field $B_0$ and RF coil 38.

In the example embodiment, RF system 30 includes an RF transmitter for producing RF pulses used in MR pulse sequences. The RF transmitter is responsive to the scan prescription and direction from pulse sequence server 20 to produce RF pulses of a desired frequency, phase, and pulse amplitude waveform. The generated RF pulses may be applied to RF coil 38 by RF system 30. Responsive MR signals detected by RF coil 38 are received by RF system 30, amplified, demodulated, filtered, and digitized under direction of commands produced by pulse sequence server 20. RF coil 38 is described as a transmit and receive coil such that RF coil 38 transmits RF pulses and detects MR signals. In one embodiment, MRI system 10 may include a transmit RF coil that transmits RF pulses and a separate receive coil that detects MR signals. A transmission channel of RF system 30 may be connected to a RF transmission coil and a receiver channel may be connected to a separate RF receive coil. Often, the transmission channel is connected to the whole body RF coil 38 and each receiver section is connected to a separate local RF coil.

In the example embodiment, RF system 30 also includes one or more RF receiver channels. Each RF receiver channel includes an RF amplifier that amplifies the MR signal received by RF coil 38 to which the channel is connected, and a detector that detects and digitizes the I and Q quadrature components of the received MR signal. The magnitude of the received MR signal may then be determined as the square root of the sum of the squares of the I and Q components as in Eq. (1) below:

$$M = \sqrt{I^2 + Q^2}; \qquad (1)$$

and the phase of the received MR signal may also be determined as in Eq. (2) below:

$$\varphi = \tan^{-1}\left(\frac{Q}{I}\right). \qquad (2)$$

In the example embodiment, the digitized MR signal samples produced by RF system 30 are received by data acquisition server 22. Data acquisition server 22 may operate in response to instructions downloaded from workstation 12 to receive real-time MR data and provide buffer storage such that no data is lost by data overrun. In some scans, data acquisition server 22 does little more than pass the acquired MR data to data processing server 24. In scans that need information derived from acquired MR data to control further performance of the scan, however, data acquisition server 22 is programmed to produce the needed information and convey it to pulse sequence server 20. For example, during prescans, MR data is acquired and used to calibrate the pulse sequence performed by pulse sequence server 20. Also, navigator signals may be acquired during a scan and used to adjust the operating parameters of RF system 30 or gradient system 28, or to control the view order in which k-space is sampled.

In the example embodiment, data processing server 24 receives MR data from data acquisition server 22 and processes it in accordance with instructions downloaded from workstation 12. Such processing may include, for example, Fourier transformation of raw k-space MR data to produce two or three-dimensional images, the application of filters to a reconstructed image, the performance of a back-projection image reconstruction of acquired MR data, the generation of functional MR images, and the calculation of motion or flow images.

In the example embodiment, images reconstructed by data processing server 24 are conveyed back to, and stored at, workstation 12. In some embodiments, real-time images are stored in a database memory cache (not shown in FIG. 1), from which they may be output to operator display 14 or a display 46 that is located near magnet assembly 34 for use by attending physicians. Batch mode images or selected real time images may be stored in a host database on disc storage 48 or on a cloud. When such images have been reconstructed and transferred to storage, data processing server 24 notifies data store server 26. Workstation 12 may be used by an operator to archive the images, produce films, or send the images via a network to other facilities.

In the example embodiment, MR system 10 includes a concomitant field correction computing device 102. Methods described herein or some actions of the methods described herein may be implemented on concomitant field correction computing device 102. Concomitant field correction computing device 102 may include workstation 12 or may be included in workstation 12. Concomitant field correction computing device 102 may be included in MR system 10, or may be included in a separate computing device that is in communication with MR system 10, through wired or wireless communication. In some embodiments, concomitant field correction computing device 102 is a computing device separate from MR system 10 and receives data acquired by MR system 10 through a portable storage device, such as a flash drive or a thumb drive. In one example, concomitant field correction computing device 102 is a server computing device, and may be cloud-based.

In some embodiments, concomitant field correction computing device 102 includes a processor-based microcontroller including a processor and a memory device wherein executable instructions, commands, and control algorithms, as well as other data and information needed to satisfactorily operate MR system 10, are stored. The memory device may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based" microcontroller should refer not only to controller devices including a processor or microprocessor, but also to other equivalent elements such as microcomputers, programmable logic controllers, reduced instruction set circuits (RISC), application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based."

In MR, when the amplitude of gradients are increased, effects of concomitant fields increase. Concomitant fields result from the principle that under Maxwell's equations, there cannot be magnetic monopoles ($\nabla \cdot \vec{B}=0$) or rotation in the field ($\nabla \times \vec{B}=0$) in current source-free space. Concomitant fields cause time and spatial varying phase variance for each sample point ($k_x$, $k_y$, $k_z$) in the k-space. Such unwanted phase can cause artifacts and errors such as image shift in EPI, blurring in spiral imaging, signal loss in fast spin echo, and inaccuracies in phase-contrast velocity mapping. Correction of concomitant field offset is particularly needed for high-performance gradient coils including those in compact head-only scanners, where the amplitudes of the gradients are increased.

Effects of lower orders of concomitant fields such as the spatially uniform and linear components of the concomitant fields may be corrected by gradient pre-emphasis or RF modulation. As used herein, the order in a high-order concomitant field term refers to spatial variation of the concomitant field term, and an order is the order of the function of the concomitant field with respect to the spatial location x, y, or z. For example, if a concomitant field term is a function of $x^2$, the concomitant field term is a second-order concomitant field term. High-order concomitant terms, however, are not corrected by gradient pre-emphasis and/or RF modulation. A correction coil may be used to correct second-order concomitant fields generated by gradient pulses in a pulse sequence. In MR, a pulse sequence or a sequence is a sequence of RF pulses, gradient pulses, and data acquisition applied by MRI system 10 in acquiring MR signals. As used herein, a pulse sequence may include compensation fields applied to second-order correction coils. An order of a concomitant field is the order of spatial dependency or variation of the concomitant field. For example, if the concomitant field is a linear function of a spatial location z, the concomitant field may be referred to as a first-order concomitant field.

A second-order concomitant field may be approximated as:

$$B_{c,2nd} \cong \frac{G_z^2}{8B_0} \cdot x^2 + \frac{G_z^2}{8B_0} \cdot y^2 + \frac{(G_x^2 + G_y^2)}{2B_0} \cdot z^2 - \frac{G_x G_z}{2B_0} \cdot xz - \frac{G_y G_z}{2B_0} \cdot yz, \quad (3)$$

where $B_{c,2nd}$ is the second-order concomitant field, $G_x$, $G_y$, and $G_z$ are gradients applied in the x, y, or z directions respectively, x, y, and z are the spatial dimensions in the image space, and $B_0$ is the static magnetic field strength of MR system 10 such as 1.5 T or 3T.

The second-order concomitant fields lead to image artifacts and errors. Effects of second-order concomitant fields need to be corrected because the effects become prominent due to the second-order dependence with the distance from the isocenter of the gradient coil assembly. For example, the second-order concomitant field may be proportional to square of the distance. Further, effects of second-order concomitant fields may not be corrected by pre-emphasis of gradient waveforms or RF modulation, unlike low-order concomitant fields of the zeroth and/or first order.

As shown in Eqn. (3), the concomitant field is inversely proportional to the field strength $B_0$. A direct solution to reduce errors from concomitant fields is to increase the field strength of magnet 36. This solution is infeasible because upgrading the field strength of an MR system, such as from 1.5 T to 3.0 T, would essentially be replacing the entire MR system and would be too expensive.

As shown in Eqn. (3), the concomitant field is also a function of square of the gradient strength G in a pulse sequence. To reduce the effects of the concomitant fields in an MR system, a user may have to resort to not using the maximum gradient strength provided by the gradient coil assembly in a pulse sequence, failing to take full advantage of capability of the gradient hardware. On the other hand, high-performance gradient coils with increased maximum gradients have increased importance in clinical applications. Accordingly, there is a long-felt need in correcting second-order concomitant fields with increased accuracy.

In known second-order correction coils, the compensation field from the correction coil has the same timing and waveform as the gradient for which the correction coil is designed to correct the concomitant fields. In the known second-order correction coils, an assumption is applied that a $z^2$ correction coil generates correction fields having only a $z^2$ spatial variation or having a spatial variation only as a function of $z^2$, which is incorrect under law of physics. As a result, phase errors from concomitant fields are only partially corrected.

In contrast, systems and methods described herein provide a second-order correction coil assembly that may be controlled to correct effects of second-order concomitant fields. The second-order correction coil assembly is decoupled from the gradient coil assembly, thereby providing flexibility in design and control of the second-order correction coil assembly. Based on the insight of law of physics, a $z^2$ correction coil generates correction fields that have an $x^2$ spatial variation and a $y^2$ spatial variation besides a $z^2$ spatial variation, and an $x^2+y^2$ correction coil generates correction fields having other spatial variations besides an $x^2+y^2$ spatial variation. Systems and methods described herein reduce residual phase errors from partial correction by RF frequency modulation or post-processing. In addition, systems and methods described herein provide a second-order correction coil assembly that is configured to correct other second-order terms in any slice orientation by a combination of correction coils configured to correct different terms of concomitant fields. Accordingly, the accuracy and flexibility in correcting the effects of second-order concomitant fields are increased.

Figure 2A:
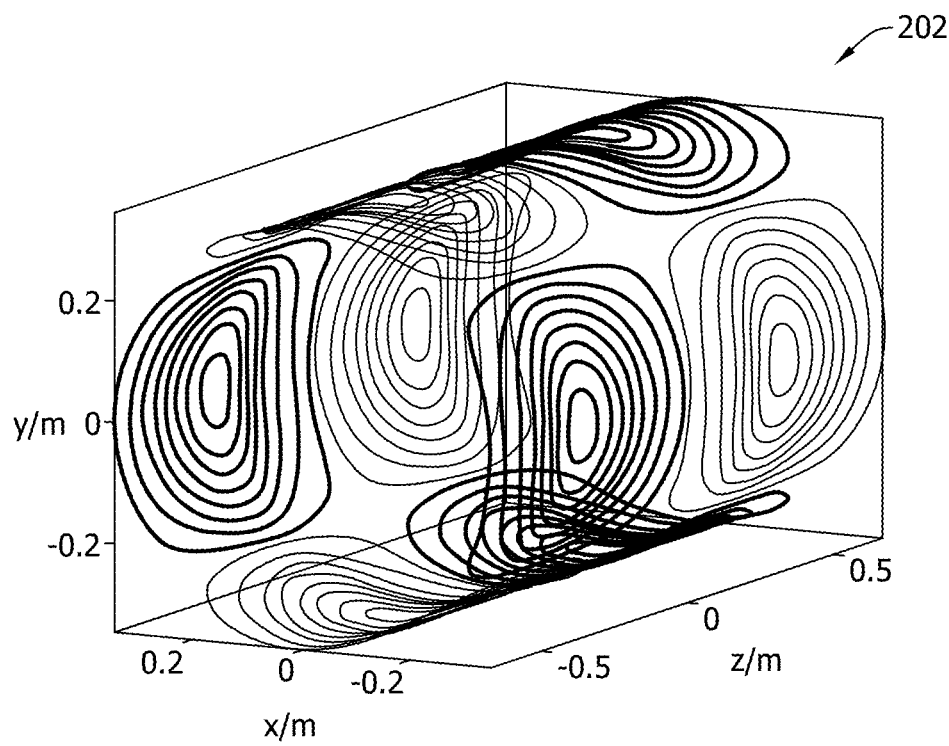
FIG. 2A is a schematic diagram of an example second-order correction coil for the MR system shown in FIG. 1.
Figure 2B:
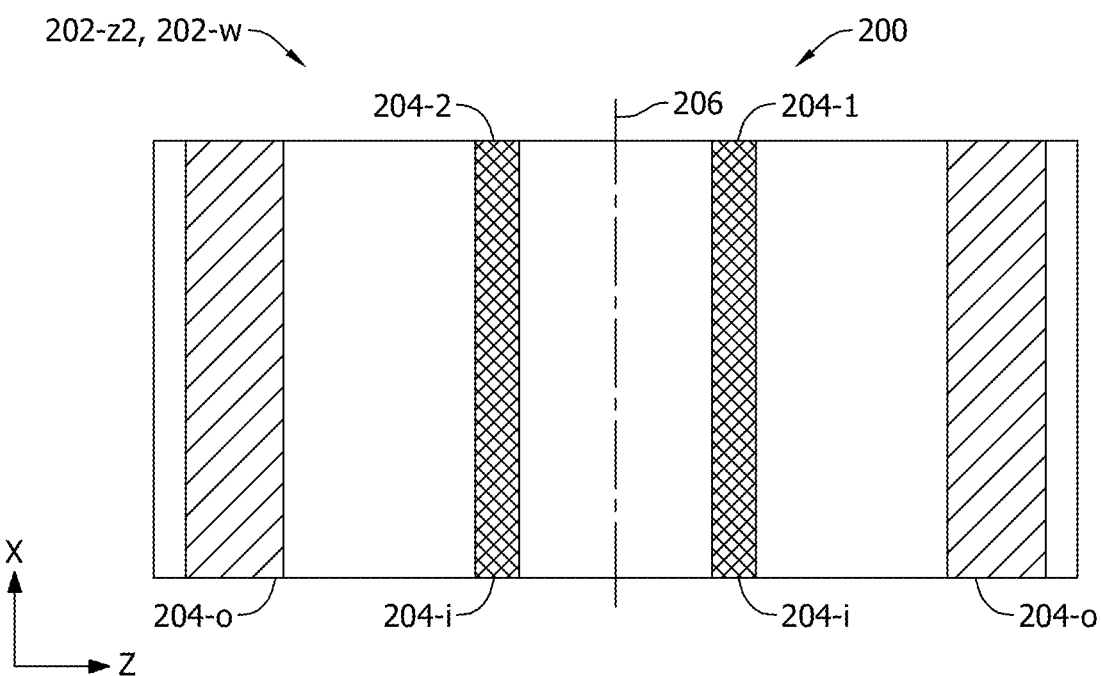
FIG. 2B is a schematic diagram of a layout of coil loops of another example second-order correction coil.
Figure 2C:
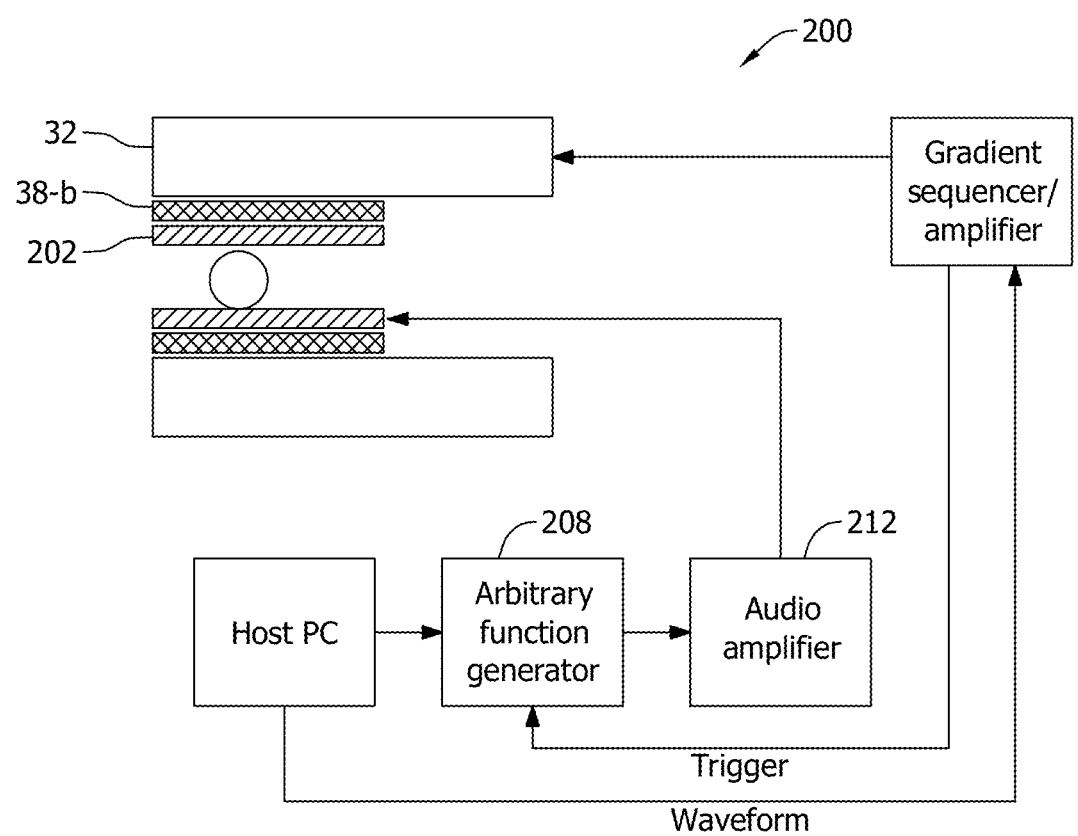
FIG. 2C is a schematic diagram of an example second-order correction coil assembly that includes the second-order coil shown in FIGS. 2A and 2B.
Figure 2D:
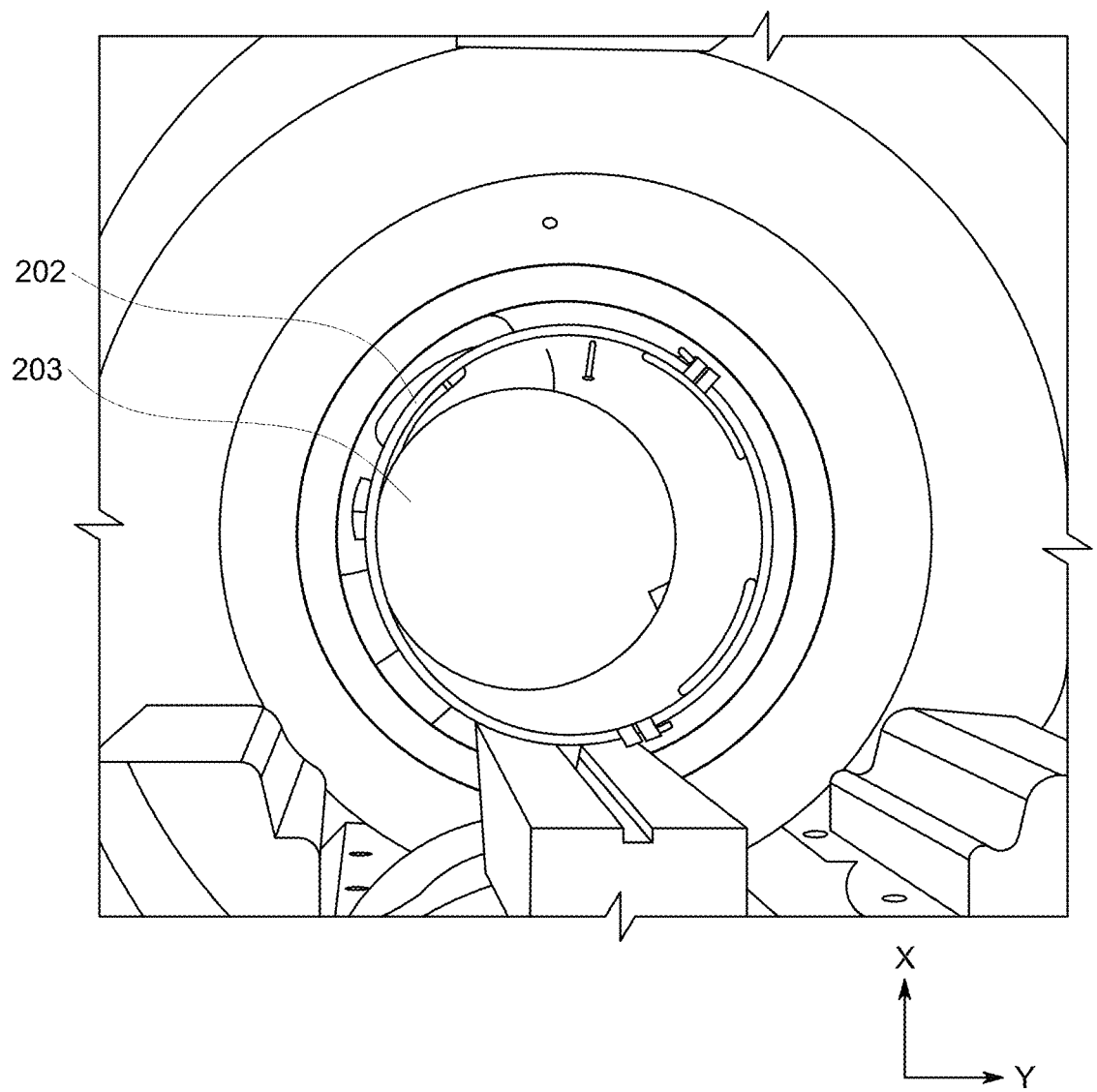
FIG. 2D shows that an example second-order coil is installed in an MR system.
Figure 2E:
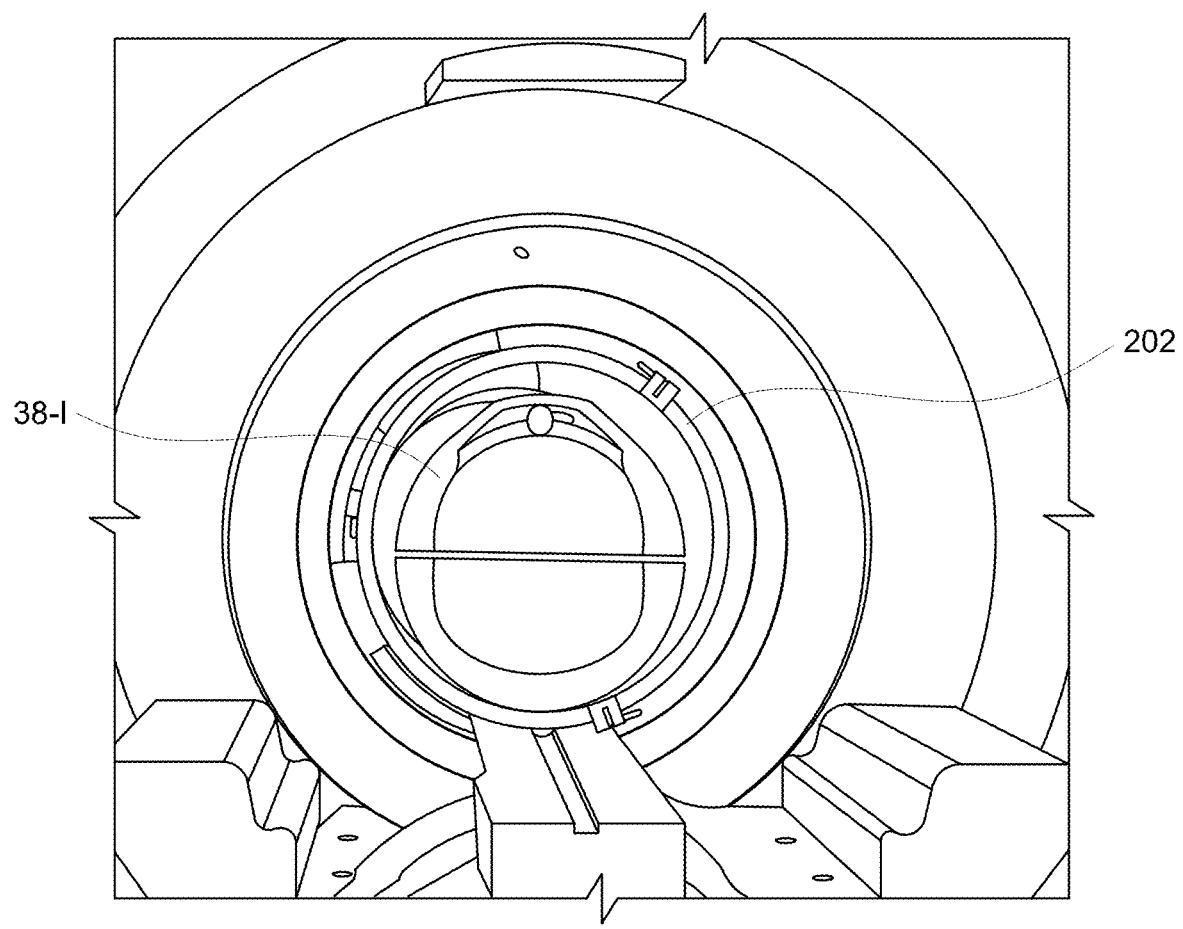
FIG. 2E shows that the MR system shown in FIG. 2D includes a local radio frequency (RF) coil.
Figure 2F:
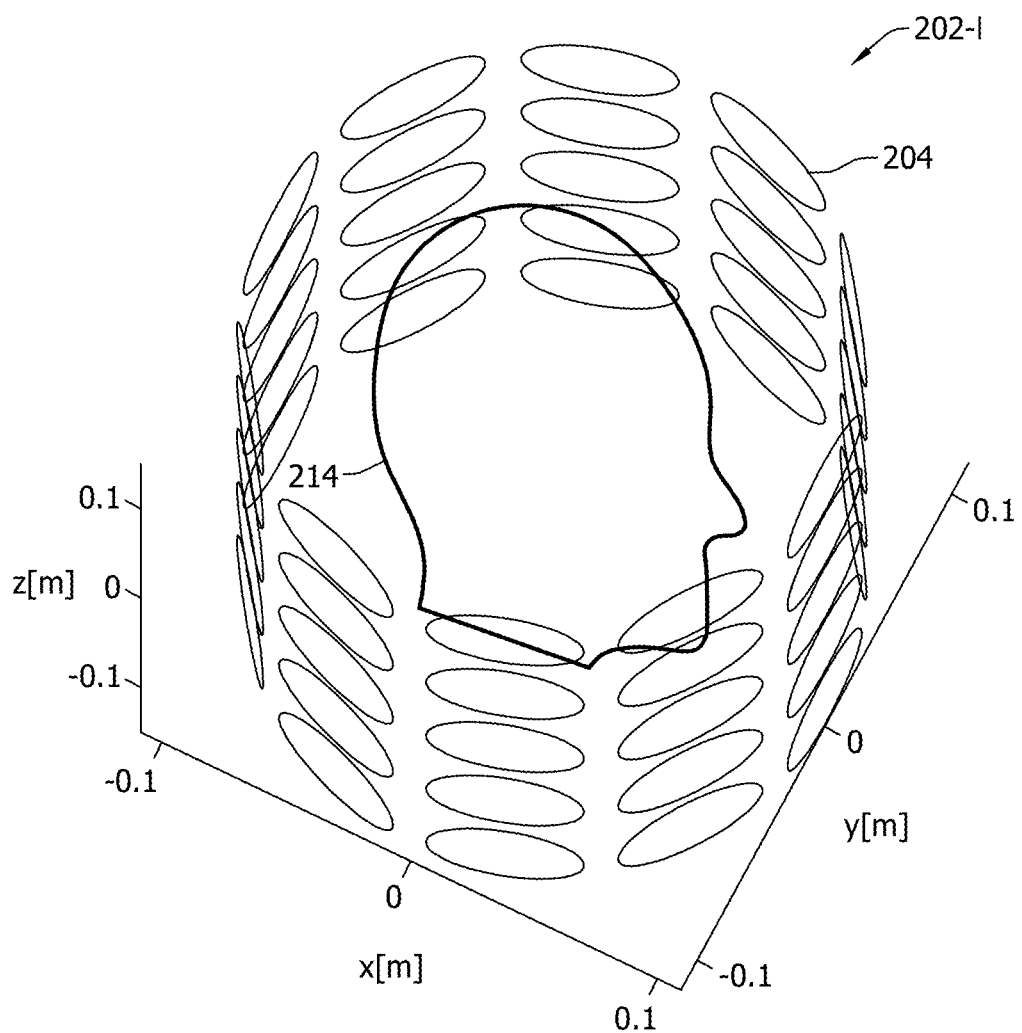
FIG. 2F shows an example multi-channel correction coil.

FIGS. 2A-2E show an example second-order correction coil assembly 200. FIG. 2A is an example wire pattern of a second-order ($x^2-y^2$) correction coil 202 in second-order correction coil assembly 200. In the example embodiment, neighboring coils are configured to be injected with current flowing in opposite directions, where the current flowing in coils depicted with thicker lines is in the opposite direction such as clock wise or counter clock wise from the current flowing in coils depicted with thinner lines. FIG. 2B is a schematic diagram of a $(z^2-(x^2+y^2)/2)$ correction coil 202-$z$2. FIG. 2C is a schematic diagram of second-order correction coil assembly 200. FIG. 2D shows second-order correction coil 202 is assembled in a bore 203 of MR system 10. FIG. 2E shows the relative positions between second-order correction coil 202 and an RF coil 38. FIG. 2F shows another example of second-order correction coil 202 with multiple channels.

In the example embodiment, second-order correction coil assembly 200 includes second-order correction coil 202. Second-order correction coil 202 is configured to correct second-order concomitant fields generated by gradient coil assembly 32.

In the example embodiment, $(z^2-(x^2+y^2)/2)$ correction coil 202-$z^2$ is configured to null concomitant field terms that spatially vary as a function of $(z^2-(x^2+y^2)/2)$ (FIG. 2B). Correction coil 202-$z$2 includes concentric loop coils wound around a former in a mirror-symmetric manner. The former may be cylindrical. For example, correction coil 202-$z$2 includes inner coil loops 204-$i$ and may further include outer coil loops 204-0. Inner or outer coil loops 204-$i$, 204-$o$ may include two groups of coils loops 204-1, 204-2. Inner coil loops 204-1 are mirror-symmetric with inner coil loops 204-2, where the coil loop pattern of inner coil loops 204-1 is an mirror image of the coil loop pattern of inner coil loops 204-2 relative to an axial plane through the isocenter or an isocenter plane 206. Similarly, outer coil loops 204-1 are mirror-symmetric with outer coil loops 204-2 relative to isocenter plane 206. Outer coil loops 204-$o$ may have more turns of loops than inner coil loops 204-$i$ to optimize correction field profile of $z^2$ fields, where z is the distance from the isocenter, while minimizing creation of $z^4$ fields. Outer coil loops 204-$o$ may be injected with current in the opposite direction from inner coil loops 204-$i$, to make $z^2$ fields stronger than $z^4$ fields in the imaging region.

In the example embodiment, second-order correction coil 202 is placed interior to RF T/R coil 38 (FIG. 2C). Second-order correction coil 202 may be included in magnet assembly 34 that defines bore 203 of magnet assembly 34, and may be referred to as a whole-body second-order correction coil 202. Second-order correction coil 202 may be integrated with a shim coil as one shim coil assembly. A shim coil is traditionally used to correct static field $B_0$ inhomogeneity. In some embodiments, second-order correction coil 202 is embedded into gradient coil assembly 32. Second-order correction coil 202 may be separate from magnet assembly 34 and positioned inside bore 203 (FIG. 2D). RF T/R coil 38-$b$ may be referred to as a body coil and is typically in magnet assembly 34. In some embodiments, MR system 10 includes a local RF coil 38-1 that is not part of magnet assembly 34 (FIG. 2E). Local RF coil 38 is positioned proximal to a subject and may have increased signal to noise ratio (SNR). Local RF coil 38 is a receive only coil, which only receives MR signals emitted from the subject. Second-order correction coil 202 may be positioned proximal to local RF coil 38.

In the example embodiment, second-order correction coil assembly 200 further includes a function generator 208 (FIG. 2C). Function generator 208 is configured to generate signals to second-order correction coil 202. Signals may be unipolar pulsed voltage signals. Second-order correction coil assembly 200 also includes an amplifier 212 configured to amplify signals generated by function generator 208. Amplifier 212 operates at a range from direct current (DC) to an audio frequency range, such as 0 Hz-20 kHz. Amplified signals outputted by amplifier 212 are transmitted to second-order correction coil 202. Amplified signals are applied to correction coil 202 configured to generate correction fields or compensation fields that compensate the effects from concomitant fields generated by gradient coil assembly 32.

FIG. 2F is a schematic diagram of another example of a second-order correction coil 202-1. Compared to second-order correction coil 202 shown in FIG. 2B, which winds around a former and may be part of magnet assembly 34, second-order correction coil 202-1 is a local correction coil. Second-order correction coil 202-1 includes coil loops 204 distributed around a coil base (not shown) with the diameter of an individual coil loop 204 being much smaller than the diameter of the coil base. In comparison, in whole-body second-order correction coil 202-$w$, wires wind around a former in a plurality of turns and the loops formed by the wires have diameters greater than the inner diameter of the former because the wires are wound on the exterior of the former. In local correction coil 202-1, individual loops 204 are distributed adjacent to but separate from one another on a surface of the coil base. Second-order correction coil 202-1 may be positioned close to a subject 214 and compensate effects of concomitant fields at a localized area. Further, local second-order correction coil 202-1 has a higher slew rate than second-order correction coil 202 shown in FIGS. 2A-2E because the inductance is smaller in local second-order correction coil 202-1 due to the shorter length of coil loop 204. In addition, local second-order correction coil 202-1 is not as bulky as a whole-body correction coil 202-$w$ and may be easier to fit into MR system 10 than whole-body correction coil 202-$w$, especially when the space in magnet assembly 34 is limited. Local second-order correction coil 202-1 is also relatively easy to be installed in MR system 10, where local second-order correction coil 202-1 may be plugged into ports of MR system, unlike whole-body correction coil 202-w, where dismantling magnet assembly 34 may be needed.

Figure 3:
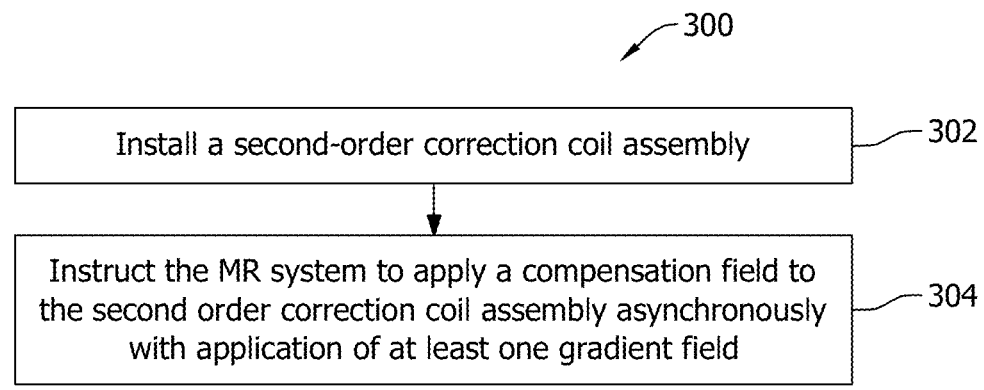
FIG. 3 is a flow chart of an example method of correcting effects of concomitant fields.

FIG. 3 is a flow chart of an example method 300 of correcting concomitant field effects. Method 300 may be implemented on concomitant field correction computing device 102. Method 300 or some actions of method 300 may be implemented on multiple concomitant field correction computing device 102, where actions in method 300 are carried out by different concomitant field correction computing devices 102. In the example embodiment, method 300 includes installing 302 a second-order correction coil assembly in an MR system. Second-order correction coil assemblies may be second-order correction coil assembly 200 described herein. Second-order correction coil assembly 200 may be assembled as part of a shim coil in magnet assembly 34. Second-order correction coil assembly 200 may be separate from a shim coil. In some embodiments, second-order correction coil assembly 200 includes a local correction coil 202 and may be assembled with a local RF coil 38, a local gradient coil, or as a stand-alone device. A local correction coil 202 may be installed in MR system 10 by being plugged into ports of MR system 10. Method 300 also includes instructing 304 the MR system to apply a compensation field to the second-order correction coil assembly asynchronously (or not necessarily simultaneously) with application of at least one gradient field by the gradient coil assembly. The compensation field is configured to correct effects of concomitant fields generated by a gradient pulse applied to a gradient coil assembly. The compensation field may be decoupled from the gradient pulse. Method 300 further includes acquiring MR signals emitted from the subject. In addition, method 300 includes outputting the MR signals. The acquired MR signals may be used in post-processing to reduce residual phase errors from partial correction of concomitant fields by second-order correction coil assembly 200.

In known methods, it is assumed that a $z^2$ correction coil generates fields that only have a $z^2$ dependency or only have a $z^2$ spatial variation, where the fields have a spatial variation as a function of $z^2$. However, the assumption is incorrect. The $z^2$ correction field generated by correction coil 202-z2 also has $x^2$ and $y^2$ dependence to satisfy the Laplace equation. A $z^2$ correction coil in fact is a $z^2-(x^2+y^2)/2$ correction coil. Similarly, it is physically impossible to construct a $(x^2+y^2)$ correction coil that only generates $(x^2+y^2)$ correction fields. The erroneous assumptions in known methods result in residual phase errors, where the concomitant fields are only partially corrected by a correction coil, resulting in residual phase errors from the concomitant fields uncorrected by the correction coil. The residual phase errors may be ignored if the imaging volume is small and proximal to the isocenter. Because the second-order concomitant fields have a high-order spatial variation or a high-order dependency with the distance from the isocenter, the residual phase errors drastically become significant in a 3D imaging or imaging slices away from the isocenter, which are the typical imaging scenarios in MR. Accordingly, in known methods, correction coils typically leave residual phase errors. The residual phase errors may be corrected by combining a $z^2$ coil with an $(x^2-y^2)$ coil in second-order coil assembly 200. Alternatively, MR signals are post-processed to correct residual phase errors. For example, the field map experienced by the subject may be estimated or measured. The field map is used to correct the residual phase errors. In one more example, the residual phase due to the partial correction is corrected via RF frequency modulation in a slice-by-slice manner if the residual phase is constant on each slice.

Figure 4A:
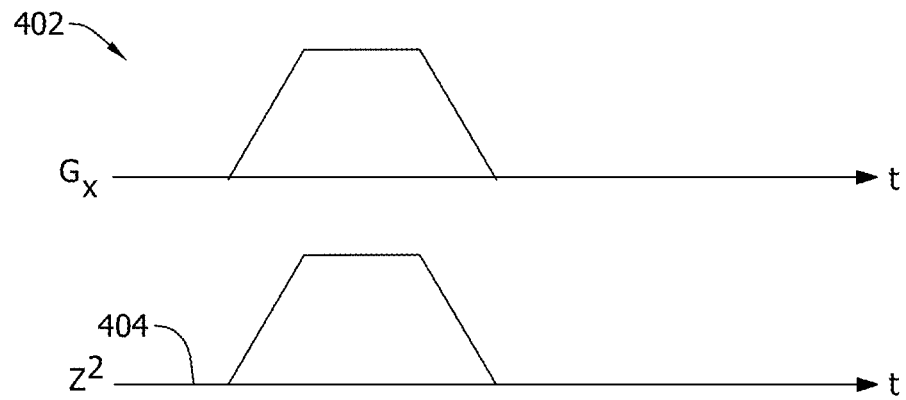
FIG. 4A shows compensation fields in a known method.
Figure 4B:
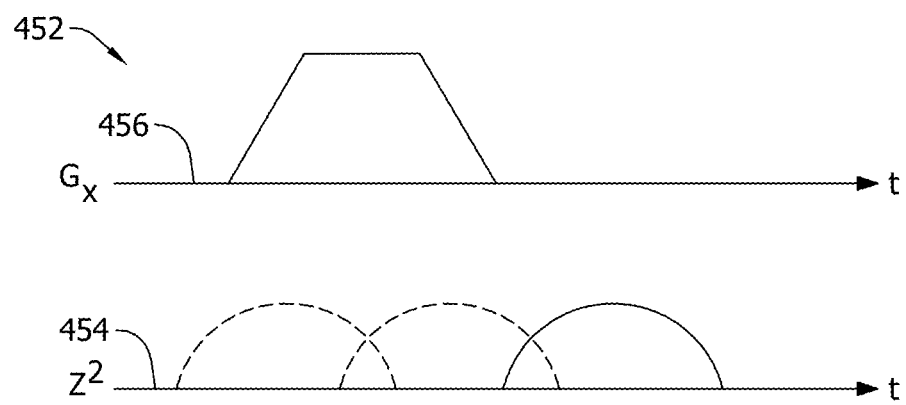
FIG. 4B shows example compensation fields of the systems and methods described herein.

FIGS. 4A and 4B compare pulse diagrams of a known method and second-order correction coil 202 of systems and methods described herein. FIG. 4A shows a pulse diagram 402 of the known method. FIG. 4B shows a pulse diagram 452 of second-order correction coil 202. In the known method, a compensation field 404 is applied to a $z^2$ correction coil to correct effects of concomitant fields generated by x-gradient Gx. In the known method, a stringent requirement is placed on the amplitude, shape, and timing of compensation field 404. The known method requires compensation field 404 is applied at the same time as x-gradient Gx and has the same waveform, such as the same pulse profile and/or amplitude, as the x-gradient Gx.

In the example embodiment, the stringent requirement is not applied to compensation field 454. Stringent requirements on second-order correction coils are unnecessary and are based on an incorrect understanding that cancelling instantaneous frequency offsets from the concomitant fields is required in order to compensate for effects from concomitant fields. In fact, as long as the phases accumulated from concomitant fields that affect the image are cancelled by the correction coil, effects from concomitant fields are compensated or corrected. Compensation field 454 may be applied asynchronously with gradient pulses or gradient fields 456 of gradient coil assembly 32, where compensation field 454 and gradient fields 456 are not necessarily synchronized with one another and may have different timing and/or waveforms. Compensation field 454 may have a different timing from gradients 456. Compensation field 454 may be applied before, during, and/or after the application of gradient pulse 456 or have different pulse duration from gradient pulse 456. Compensation field 454 may have a different waveform from gradients 456. Compensation field 454 may not have the same amplitude or pulse profile as x-gradient Gx. Instead, the waveforms and amplitudes are limited by the phases of the field accumulated by the second-order correction coil that match the phases accumulated from the concomitant fields. For example, second-order concomitant fields may be estimated with Eqn. (3). The field generated by correction coil 202 for a correction pulse 454 may also be estimated. Because a phase is proportional to a time integral of the field, the phase accumulated from second-order concomitant fields and the phase from compensation field 454 may be estimated. The pulse waveform, amplitude, and pulse duration of compensation field 454 may be adjusted to match the two phases. Compensation field 454 may be limited by the sequence length, such as TR (repetition time), such that the pulse length of compensation field 454 does not lengthen the TR time of the pulse sequence.

Decoupling second-order correction coil 202 from gradient coil assembly 32 provides flexibility in the amplitude, pulse shapes, and timing, and is advantageous. A second-order correction coil tends to have high inductance and low available driver power compared to gradient coils, and may face difficulties in matching the gradient waveforms, especially in high-performing gradient coil assemblies where the amplitude of the gradients may reach (or exceed) 200 m T/m and the slew rate of the gradients may reach (or exceed) 500 T/m/s. With the flexibility in waveform and timing provided, the number of turns of coil loops in second-order correction coil may be increased to increase the available strength of the correction field without concerning about a stringent requirement on the switch speed, thereby reducing power requirement on the driver. Second-order correction coil 202 being decoupled from gradient coils is advantageous also in reducing or avoiding induction of currents in one another and deterioration of the pulses applied to second-order correction coil 202 and gradient coil assembly 32. As a result, correction of effects from concomitant field is improved. Correction coil 202 may be decoupled from gradient coil assembly 32 by dynamic disabling or blanking of correction coil 202 when correction coil 202 is not used.

Figure 5A:
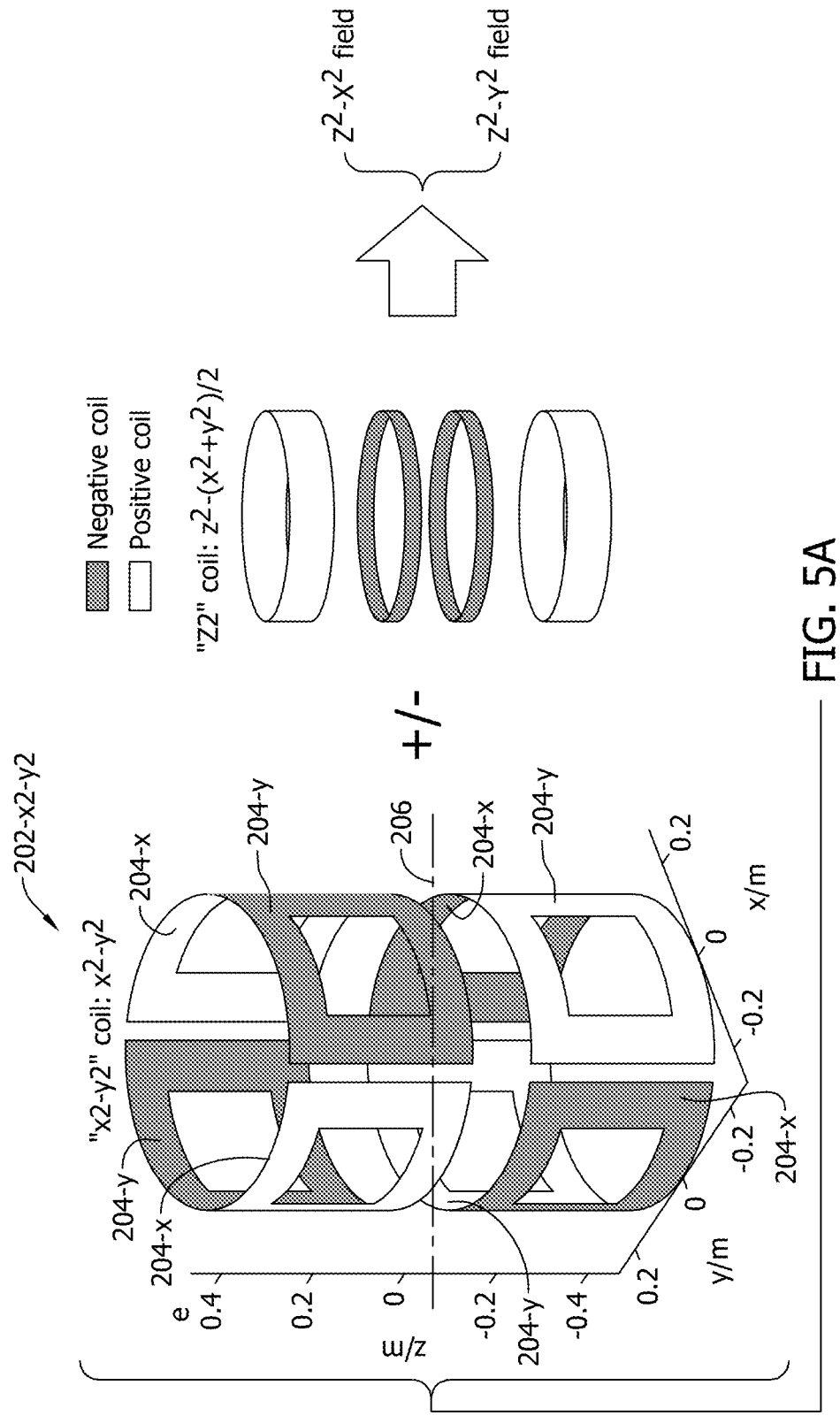
FIG. 5A is a schematic diagram in correcting effects from terms of concomitant fields using a plurality of second-order correction coils.

FIGS. 5A and 5B show that second-order correction coil assembly 200 may include a plurality of second-order correction coils 202. Each of the plurality of second-order correction coils 202 is configured to correct a different term of concomitant fields. For example, second-order correction coil 202-x2-y2 is configured to correct the part of concomitant fields that spatially vary as a function of $(x^2-y^2)$. The compensation field generated by an $x^2-y^2$ may be referred to as an $x^2-y^2$ compensation field. Second-order correction coil 202-x2-y2 includes coil loops 204-x to generate correction fields in the x direction and coil loops 204-y rotate 90° from coil loops 204-x to generate correction fields in the y direction. Coil loops 204-x are injected with currents in the opposite polarity from its neighboring coil loops 204-y. Two sets of coil loops 204-x, 204-y are distributed on either sides of the isocenter plane 206. The current polarities are opposite between the x coil loops 204-x and the neighboring x coil loops 204-x on the other side of the isocenter plane 206 to generate second-order correction field varying in the x direction. The current polarities are opposite between the y coil loops 204-y and the neighboring y coil loops 204-y on the other side of the isocenter plane 206 to generate second-order correction field varying in the y direction. As such, second-order correction coil 202-x2-y2 is configured to generate correction field as a function of $(x^2-y^2)$.

In the example embodiment, second-order correction coil 202-$z^2$ is configured to correct the part of concomitant fields that spatially vary as a function of $(z^2-(x^2+y^2)/2)$ and may be referred to as a $z^2-(x^2+y^2)/2$ correction coil or a $z^2$ correction coil for simplicity. The combination of second-order correction coil 202-x2-y2 and 202-z2 may be used to correct a concomitant field that spatially varies as a function of $z^2-x^2$ or $z^2-y^2$. The currents delivered to individual second-order correction coils are adjusted in the combination. For example, if the current to second-order correction coil 202-x2-y2 is reduced by half, the second-order correction coil assembly 200 is configured to correct a concomitant field that spatially varies as a function of $z^2-y^2$ or generate a $z^2-y^2$ compensation field. If the current to second-order correction coil 202-x2-y2 is reduced by half and with a reversed polarity, second-order correction coil assembly 200 is configured to correct a concomitant field spatially varying as a function of $z^2-x^2$ or generate a $z^2-x^2$ compensation field.

FIG. 5B shows combinations of second-order correction coils 202-z2 and 202-x2-y2 to correct concomitant fields that spatially vary as other functions for any slice orientations. For example, if the 2D imaging slice is axial, second-order correction coil 202 may not be used to correct a $z^2$ field generated by a Gx or Gy gradient. Instead, RF frequency adjustment or modulation may be used because z is constant in an axial slice. If the imaging slice is coronal where y is constant, to correct $z^2$ field caused by Gx or Gy gradient, a $z^2-y^2$ compensation field is generated by a $z^2$ correction coil combined with an $x^2-y^2$ correction coil at half of the current. Because y is constant for a coronal slice, the generated $z^2-y^2$ field may compensate pure $z^2$-dependent concomitant field. If the imaging slice is sagittal, where x is constant, a $z^2-x^2$ compensation field is generated by a $z^2$ correction coil combined with an $x^2-y^2$ correction coil at half of the current and with the current polarity reversed. Because x is constant for a sagittal slice, the $z^2-x^2$ field may compensate pure $z^2$-dependent concomitant field. Second-order correction coil assembly 200 may be used to correct concomitant field $x^2+y^2$ generated by Gz gradients. If the slice is axial where z is constant, a $z^2$ correction coil, which creates a $z^2-(x^2+y^2)/2$ field, is used to correct the $x^2+y^2$ term. If the imaging slice is coronal, because y is constant, $x^2-y^2$ correction coil is used to correct $x^2$ term. If the imaging slice is sagittal, because x is constant, $x^2-y^2$ correction coil is used to correct $y^2$ term. As a result, second-order correction coil assembly 200 is used to correct second-order terms $z^2$ and/or $x^2+y^2$ in concomitant fields generated by any gradient coil in any Cartesian (non-oblique) slice orientation. If the slice is oblique, three additional second-order correction coils with spatial dependencies of xy, zx, zy are needed to accomplish compensation after combination of $z^2$ and/or $x^2-y^2$ coils.

Figure 6A:
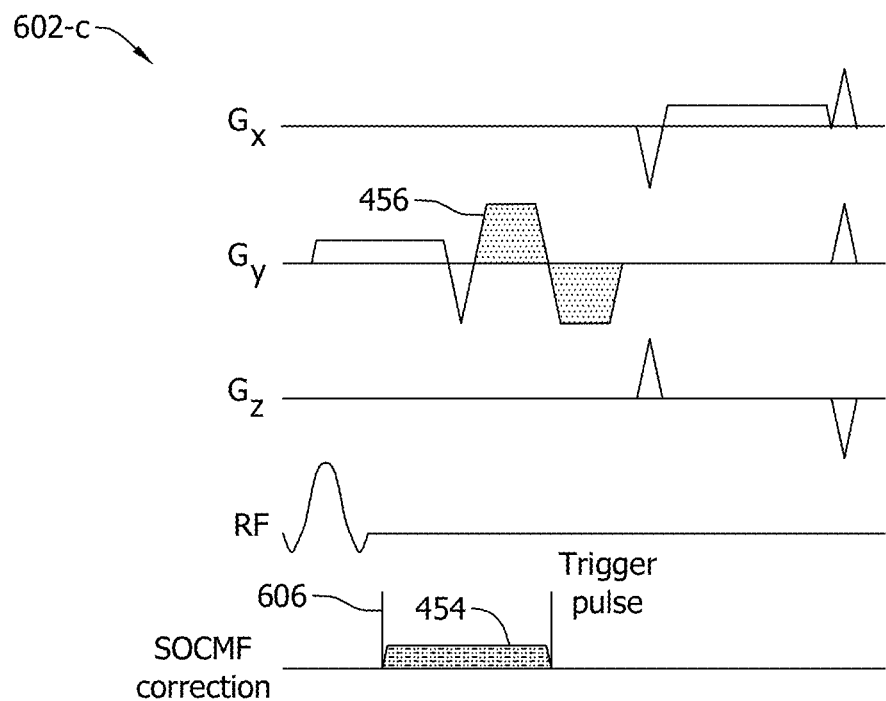
FIG. 6A is a schematic diagram of an example phase-contrast pulse sequence for a coronal acquisition.
Figure 6B:
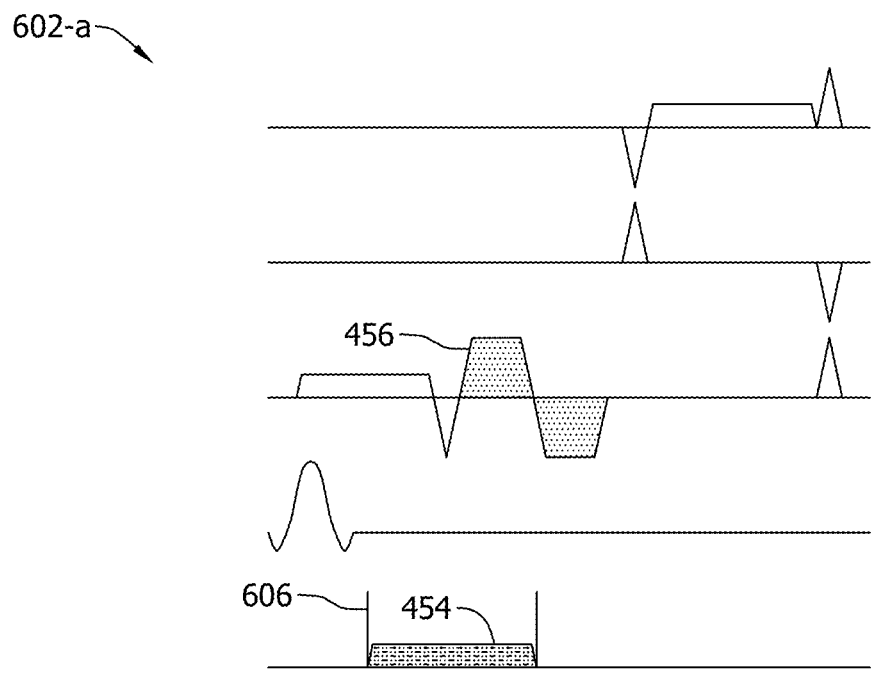
FIG. 6B is a schematic diagram of an example pulse sequence for an axial acquisition.
Figure 6C:
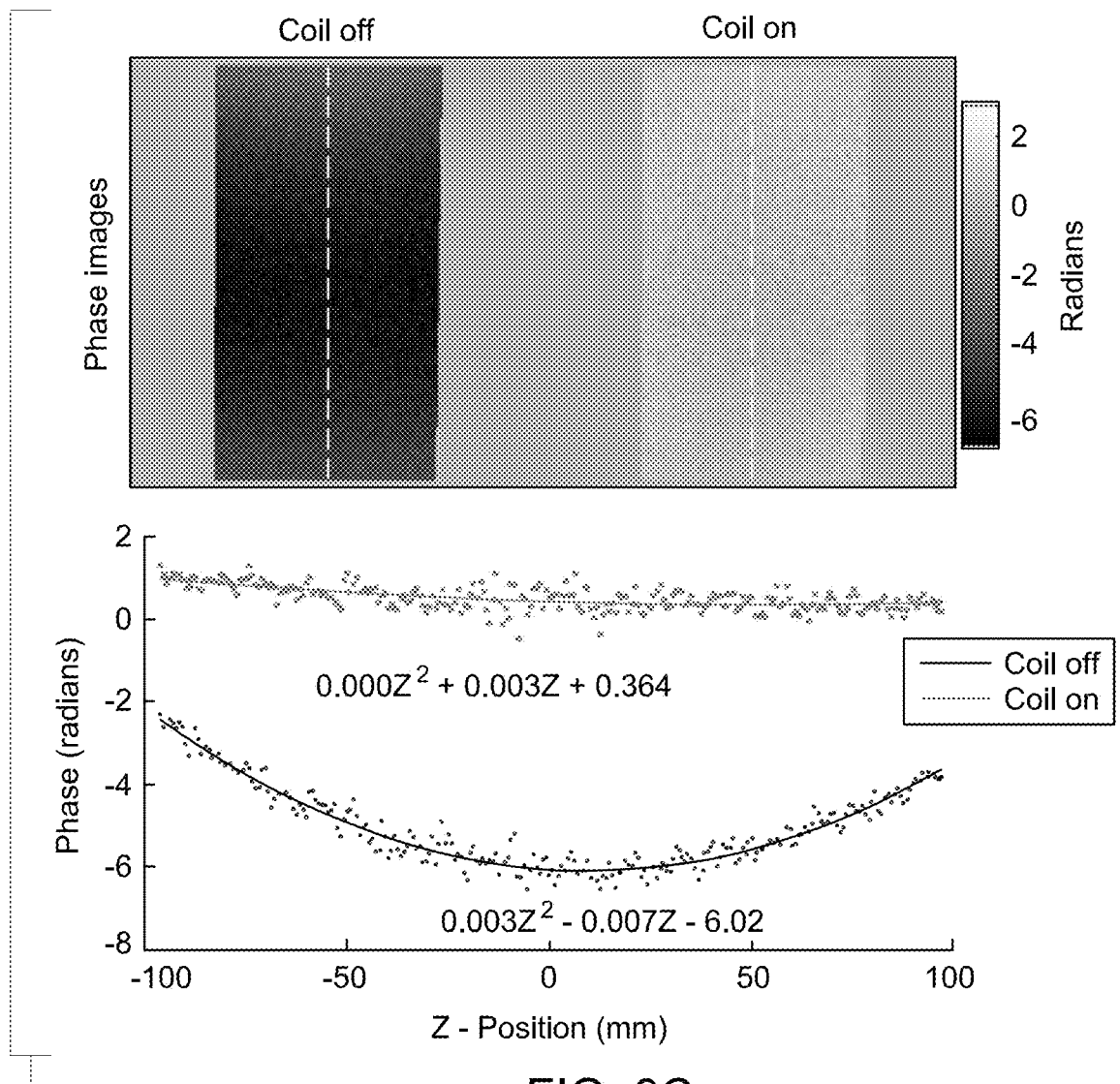
FIG. 6C shows a significant reduction in phase accumulated from second-order concomitant fields using the pulse sequence shown in FIG. 6A.
Figure 6D:
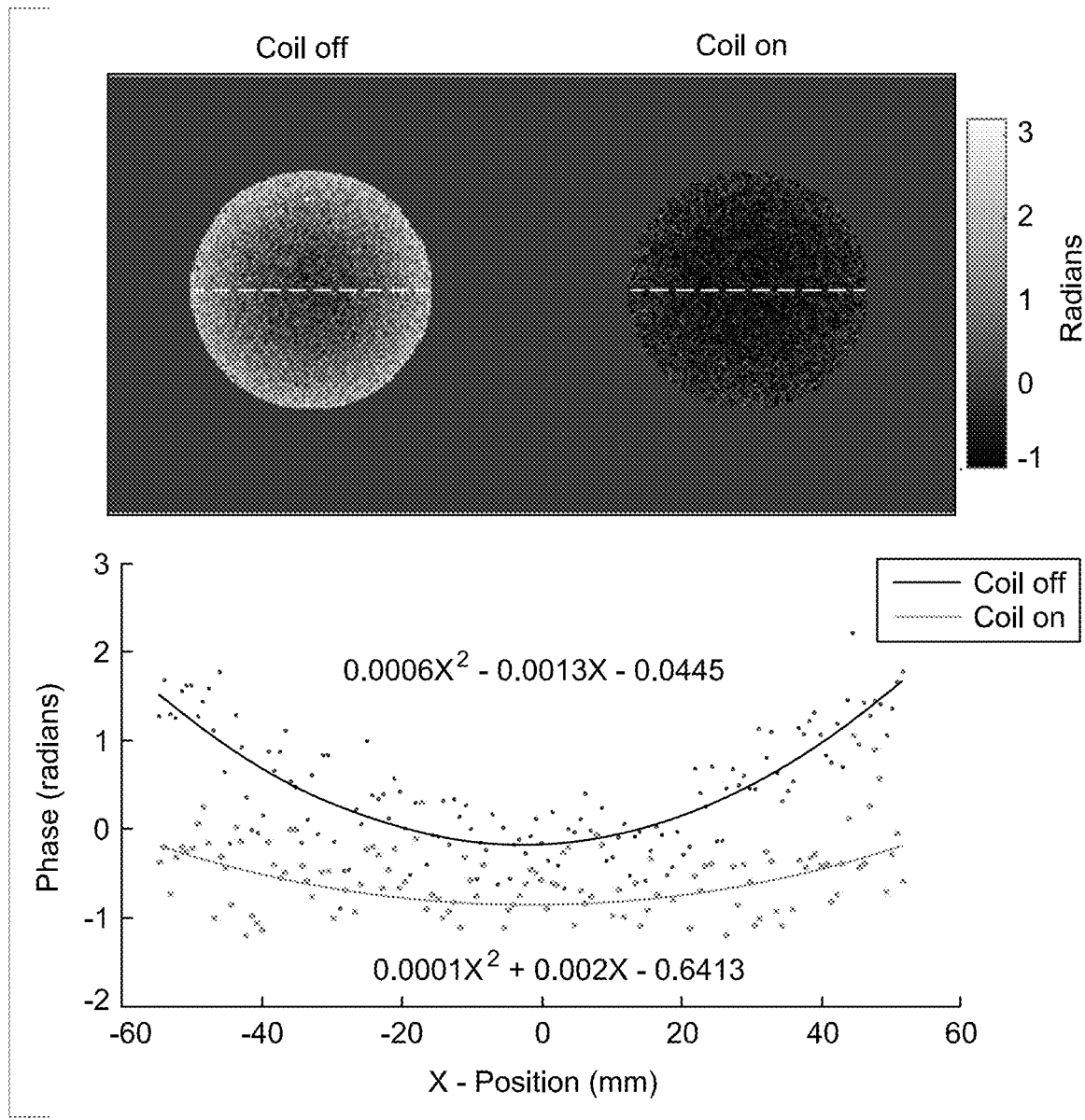
FIG. 6D shows a significant reduction in phase accumulated from second-order concomitant fields using the pulse sequence shown in FIG. 6B.

FIGS. 6A-6D show systems and methods described herein that are used to correct second-order concomitant field effects in coronal and axial slices. FIG. 6A shows a single-sided phase contrast pulse sequence 602-c of a coronal acquisition with y-directional flow encoding and with correction coil 202 turned on. FIG. 6B shows a phase contrast pulse sequence 602-a of an axial acquisition with z-directional flow encoding and with correction coil 202 turned on. A phase contrast sequence includes bipolar gradients 456 to measure flow in the subject. When bipolar gradients 456 and correction coil 202 are turned off, pulse sequence 602 may be used for background phase correction. The effects from zeroth- and first-order concomitant fields may be corrected by frequency shifting in the RF pulses and gradient pre-emphasis in the gradients. Second-order correction coil assembly 200 corrects the effects from second-order concomitant fields. Bipolar gradients 456 for phase contrast are turned on in the y direction in pulse sequence 602-c, and are applied in the z direction in pulse sequence 602-a. Trigger pulses 606 may be included to define the timing of the correction fields which does not have to coincide with gradient pulse 456. Compensation fields 454 are used to correct effects of concomitant fields generated by phase contrast gradients 456. The pulse waveform of compensation fields 454 and phase contrast gradients 456 are not necessarily the same. Compensation fields 454 are applied at the same time as phase contrast gradients 456 as examples for illustration purposes only. Compensation fields 454 may have a different timing from phase contrast gradients 456, such as having different starting time, ending time, and/or duration from phase contrast gradients 456. Compensation fields 454 may be applied anywhere between the end of slice selection and start of readout.

Correction field generated by the correction coil reduced the phase errors from second order concomitant fields accrued in the coronal and axial PC acquisition by 100% (FIG. 6C) and 83% (FIG. 6D) respectively. The reduction is indicated in the fit to the experimental data by the coefficients of $z^2$ and $x^2$ for the coronal and axial acquisitions respectively.

Figure 7A:
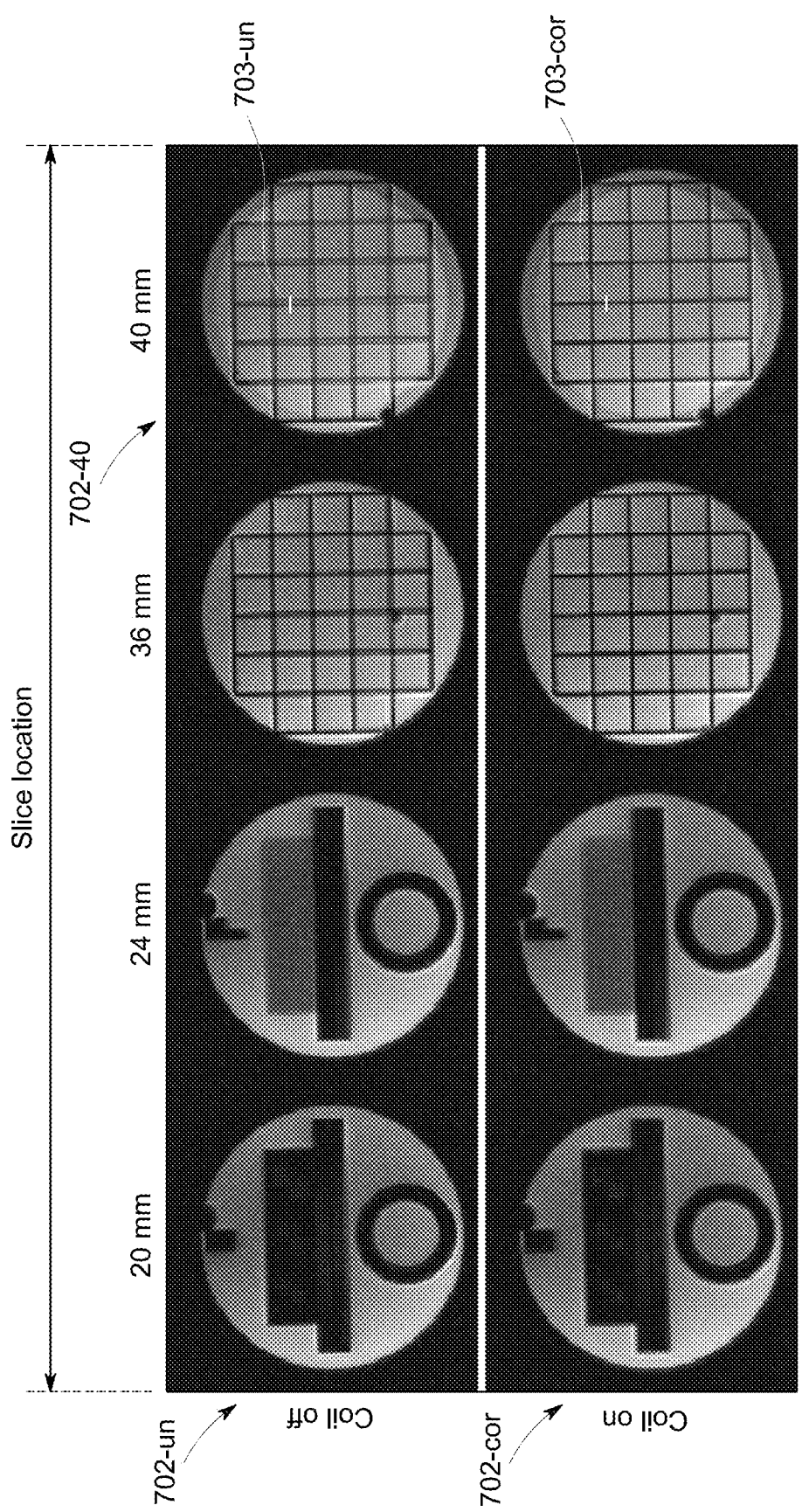
FIG. 7A is a comparison of spiral 2D gradient echo (GRE) images with the second-order correction coil assembly turned on and images with the second-order correction coil assembly turned off.
Figure 7B:
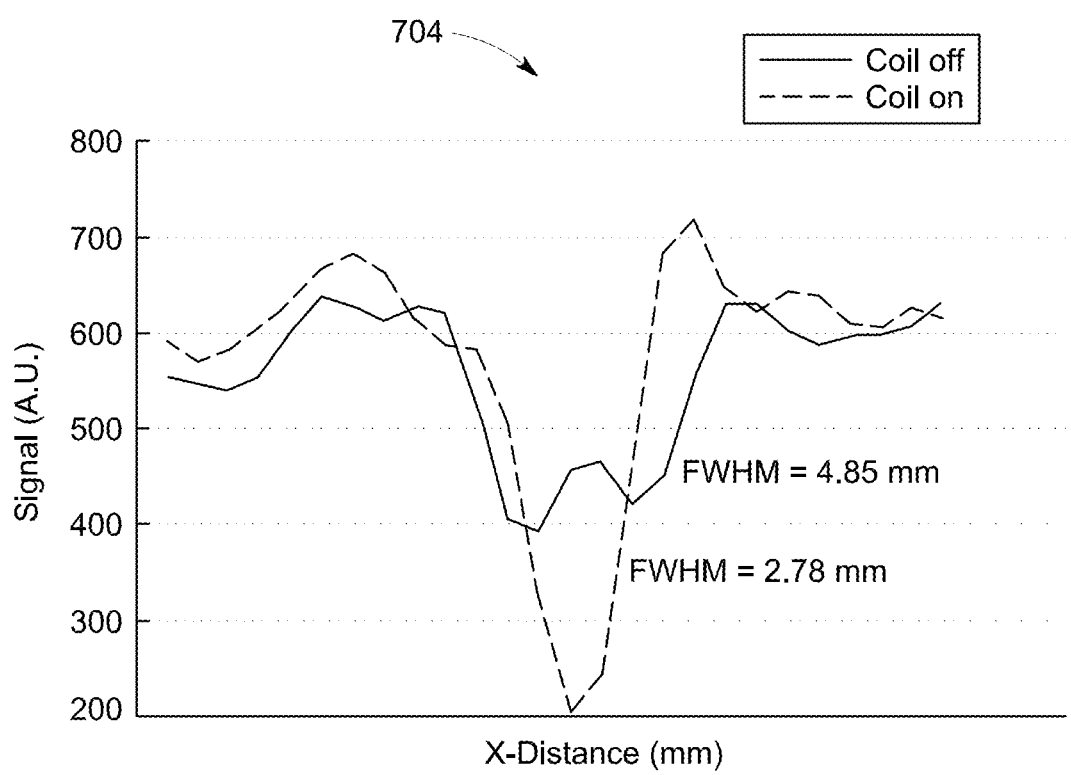
FIG. 7B is a comparison of line profiles of a line on the acquired spiral 2D GRE image (in FIG. 7A) of a slice 40 mm from the isocenter when the second-order correction coil assembly is turned on versus when the second-order correction coil assembly is turned off.

FIGS. 7A and 7B show second-order correction coil assembly may be used to correct blurring caused by second-order concomitant fields in non-Cartesian acquisition. FIG. 7A is a comparison of images 702-un, where second-order correction coil assembly 200 is turned off, with images 702-cor, where second-order correction coil assembly 200 is turned on. FIG. 7B is a comparison of line profiles of a line 703 in images at a slice 40 mm away from the isocenter of gradient coil assembly 32, when second-order correction coil assembly 200 is turned on (see line 703-cor) or off (see line 703-*un*). The images were acquired with a two-dimensional (2D) spiral sequence, where the k-space is sampled along a spiral trajectory. The in-plane blurring in 2D GRE (gradient recalled echo) spiral-out imaging due to phase errors from second order concomitant fields accrual was substantially reduced by correction coil assembly 200. The top row includes uncorrected images 702-*un* acquired when the correction coil assembly was off. The bottom row includes corrected images 702-cor acquired when the correction coil assembly was on. The amount of blurring is highest in slices that are farthest from the isocenter of the gradient coil assembly (images 702-40). The width of the line profile on the images at z=40 mm demonstrates 42.7% reduction in blurring and substantial increase in contrast when the correction coil was turned on (plot 704).

Figure 8:
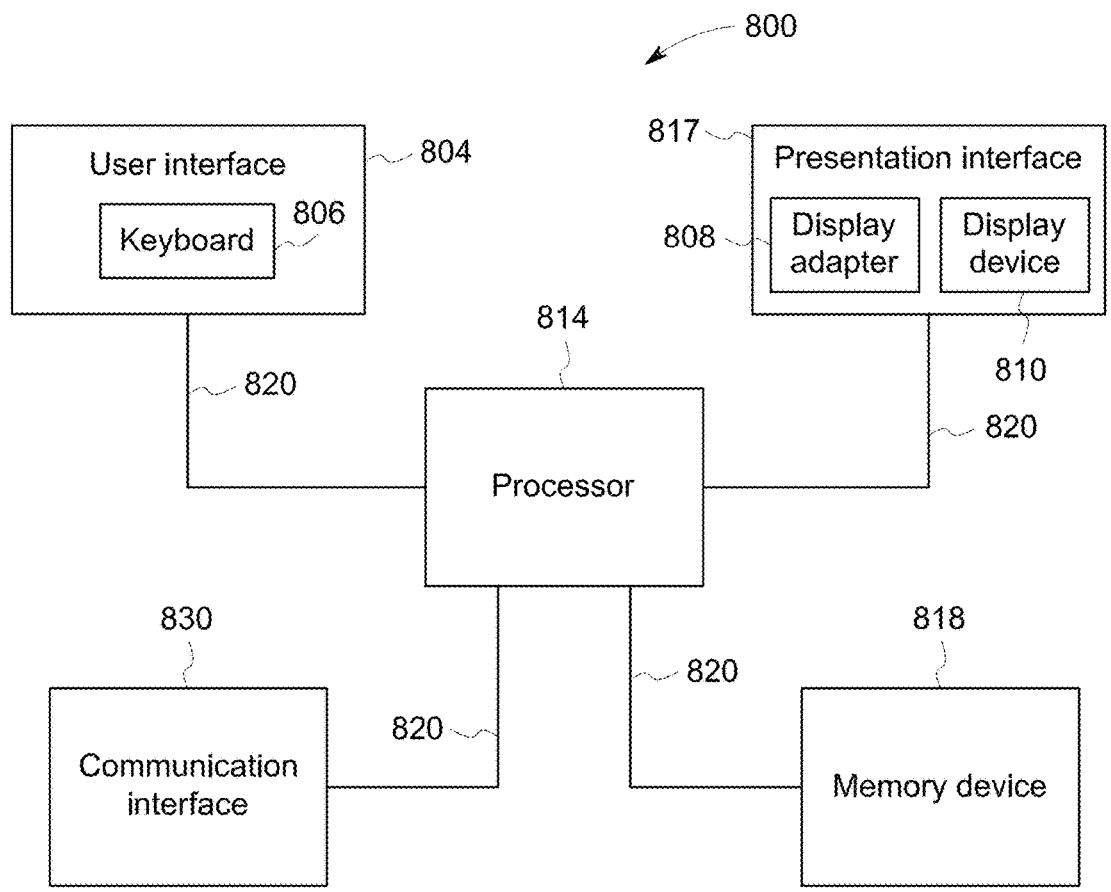
FIG. 8 is a block diagram of an example computing device.

Workstation 12 and concomitant field correction computing device 102 described herein may be any suitable computing device 800 and software implemented therein. FIG. 8 is a block diagram of an example computing device 800. In the example embodiment, computing device 800 includes a user interface 804 that receives at least one input from a user. User interface 804 may include a keyboard 806 that enables the user to input pertinent information. User interface 804 may also include, for example, a pointing device, a mouse, a stylus, a touch sensitive panel (e.g., a touch pad and a touch screen), a gyroscope, an accelerometer, a position detector, and/or an audio input interface (e.g., including a microphone).

Moreover, in the example embodiment, computing device 800 includes a presentation interface 817 that presents information, such as input events and/or validation results, to the user. Presentation interface 817 may also include a display adapter 808 that is coupled to at least one display device 810. More specifically, in the example embodiment, display device 810 may be a visual display device, such as a cathode ray tube (CRT), a liquid crystal display (LCD), a light-emitting diode (LED) display, and/or an "electronic ink" display. Alternatively, presentation interface 817 may include an audio output device (e.g., an audio adapter and/or a speaker) and/or a printer.

Computing device 800 also includes a processor 814 and a memory device 818. Processor 814 is coupled to user interface 804, presentation interface 817, and memory device 818 via a system bus 820. In the example embodiment, processor 814 communicates with the user, such as by prompting the user via presentation interface 817 and/or by receiving user inputs via user interface 804. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition and/or meaning of the term "processor."

In the example embodiment, memory device 818 includes one or more devices that enable information, such as executable instructions and/or other data, to be stored and retrieved. Moreover, memory device 818 includes one or more computer readable media, such as, without limitation, dynamic random access memory (DRAM), static random access memory (SRAM), a solid state disk, and/or a hard disk. In the example embodiment, memory device 818 stores, without limitation, application source code, application object code, configuration data, additional input events, application states, assertion statements, validation results, and/or any other type of data. Computing device 800, in the example embodiment, may also include a communication interface 830 that is coupled to processor 814 via system bus 820. Moreover, communication interface 830 is communicatively coupled to data acquisition devices.

In the example embodiment, processor 814 may be programmed by encoding an operation using one or more executable instructions and providing the executable instructions in memory device 818. In the example embodiment, processor 814 is programmed to select a plurality of measurements that are received from data acquisition devices.

In operation, a computer executes computer-executable instructions embodied in one or more computer-executable components stored on one or more computer-readable media to implement aspects of the invention described and/or illustrated herein. The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Figure 9:
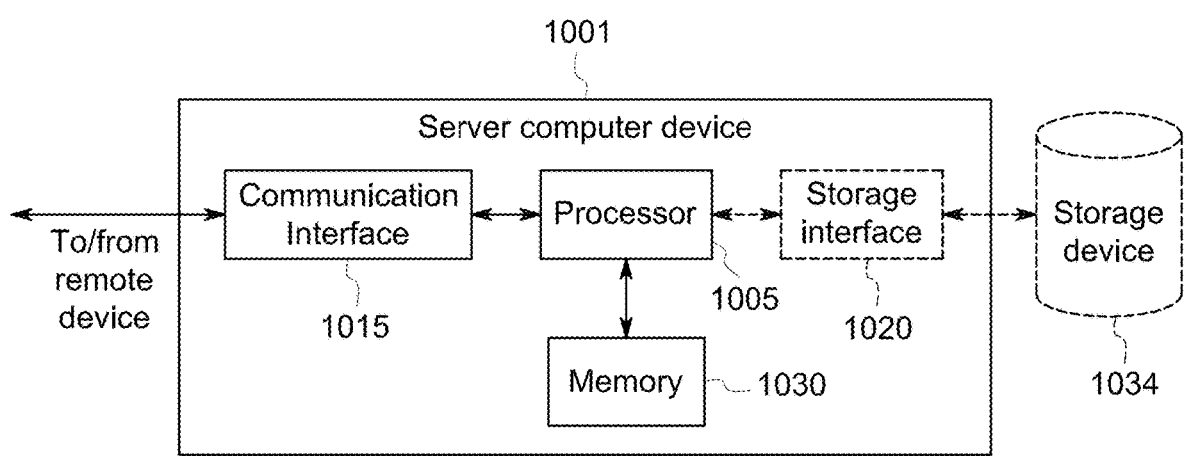
FIG. 9 is a block diagram of an example server computing device.

FIG. 9 illustrates an example configuration of a server computer device 1001 such as computing device 102. Server computer device 1001 also includes a processor 1005 for executing instructions. Instructions may be stored in a memory area 1030, for example. Processor 1005 may include one or more processing units (e.g., in a multi-core configuration).

Processor 1005 is operatively coupled to a communication interface 1015 such that server computer device 1001 is capable of communicating with a remote device or another server computer device 1001. For example, communication interface 1015 may receive data from workstation 12, via the Internet.

Processor 1005 may also be operatively coupled to a storage device 1034. Storage device 1034 is any computer-operated hardware suitable for storing and/or retrieving data. In some embodiments, storage device 1034 is integrated in server computer device 1001. For example, server computer device 1001 may include one or more hard disk drives as storage device 1034. In other embodiments, storage device 1034 is external to server computer device 1001 and may be accessed by a plurality of server computer devices 1001. For example, storage device 1034 may include multiple storage units such as hard disks and/or solid state disks in a redundant array of independent disks (RAID) configuration. storage device 1034 may include a storage area network (SAN) and/or a network attached storage (NAS) system.

In some embodiments, processor 1005 is operatively coupled to storage device 1034 via a storage interface 1020. Storage interface 1020 is any component capable of providing processor 1005 with access to storage device 1034. Storage interface 1020 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1005 with access to storage device 1034.

At least one technical effect of the systems and methods described herein includes (a) providing a compensation field asynchronously from gradients; (b) correcting residual phase errors due to partial correction; and (c) providing $z^2$ and/or $x^2+y^2$ compensation fields in any slice orientation by a combination of a $z^2$ correction coil and an $x^2-y^2$ correction coil.

Example embodiments of systems and methods of correcting concomitant field effects are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A magnetic resonance (MR) system for correcting concomitant field effects, comprising:
    a gradient coil assembly comprising a plurality of gradient coils configured to apply at least one gradient field to a polarizing magnetic field of the MR system;
    a second-order correction coil assembly comprising a first second-order correction coil configured to correct effects of a first term of second-order concomitant fields generated by the at least one gradient field, wherein the second-order correction coil assembly further comprises a second second-order correction coil configured to correct a second term of the second-order concomitant fields, and the second-order correction coil assembly is configured to correct a third term of the second-order concomitant fields based on a combination of the first second-order correction coil and the second second-order correction coil, wherein the first term of the second-order concomitant fields, the second term of the second-order concomitant fields, and the third term of the second-order concomitant fields are different from one another; and
    a second-order correction computing device comprising at least one processor in communication with at least one memory device, and the at least one processor programmed to:
        control the second-order correction coil assembly by instructing the MR system to apply a compensation field to the second-order correction coil assembly asynchronously with the at least one gradient field, wherein the compensation field has a different shape of waveform from a waveform of the at least one gradient field.

2. The MR system of claim 1, wherein the at least one processor is programmed to:
    control the second-order correction coil assembly by instructing the MR system to apply the compensation field having a different timing from a timing of the at least one gradient field.

3. The MR system of claim 1, wherein the at least one processor is programmed to:
    control the second-order correction coil assembly by instructing the MR system to apply the compensation field that has a different waveform from the waveform of the at least one gradient field.

4. The MR system of claim 1, wherein the first second-order correction coil is a $z^2-(x^2+y^2)/2$ correction coil, and the at least one processor is programmed to:
    correct residual phase errors caused by the second-order concomitant fields by taking account of an $x^2$ spatial variation and a $y^2$ spatial variation in the compensation field generated by the first second-order correction coil.

5. The MR system of claim 4, wherein the at least one processor is programmed to:
    correct the residual phase errors by applying radio-frequency (RF) frequency modulation.

6. The MR system of claim 1, wherein the first second-order correction coil is a $z^2-(x^2+y^2)/2$ correction coil and the second second-order correction coil is an $x^2-y^2$ correction coil.

7. The MR system of claim 1, wherein the second-order correction coil assembly is configured to correct a $z^2-x^2$ term of the second-order concomitant fields.

8. The MR system of claim 1, wherein the second-order correction coil assembly is configured to correct a $z^2-y^2$ term of the second-order concomitant fields.

9. The MR system of claim 1, wherein the second-order correction coil assembly is configured to correct a $z^2$ term of the second-order concomitant fields.

10. The MR system of claim 1, wherein the second-order correction coil assembly is configured to correct an $x^2+y^2$ term of the second-order concomitant fields.

11. The MR system of claim 1, wherein the first second-order correction coil is a local correction coil.

12. A second-order correction coil assembly for correcting concomitant field effects in a magnetic resonance (MR) system, comprising:
    a first second-order correction coil configured to correct a first term of second-order concomitant fields generated by a gradient coil assembly of an MR system; and
    a second second-order correction coil configured to correct a second term of the second-order concomitant fields,
    wherein the second-order correction coil assembly is configured to correct a third term of the second-order concomitant fields based on a combination of the first second-order correction coil and the second second-order correction coil, wherein the first term of the second-order concomitant fields, the second term of the second-order concomitant fields, and the third term of the second-order concomitant fields are different from one another.

13. The second-order correction coil assembly of claim 12, wherein the second-order correction coil assembly is configured to correct a $z^2-x^2$ term of the second-order concomitant fields.

14. The second-order correction coil assembly of claim 12, wherein the second-order correction coil assembly is configured to correct a $z^2-y^2$ term of the second-order concomitant fields.

15. The second-order correction coil assembly of claim 12, wherein the first second-order correction coil is a $z^2-(x^2+y^2)/2$ correction coil and the second second-order correction coil is an $x^2-y^2$ correction coil.

16. A method of correcting concomitant field effects in a magnetic resonance (MR) system, comprising:

installing a second-order correction coil assembly in an MR system, wherein the second-order correction coil assembly includes a first second-order correction coil configured to correct effects of a first term of second-order concomitant fields generated by a gradient coil assembly of the MR system, the second-order correction coil assembly further comprises a second second-order correction coil configured to correct a second term of the second-order concomitant fields, and the second-order correction coil assembly is configured to correct a third term of the second-order concomitant fields based on a combination of the first second-order correction coil and the second second-order correction coil, wherein the first term of the second-order concomitant fields, the second term of the second-order concomitant fields, and the third term of the second-order concomitant fields are different from one another;

instructing the MR system to apply a compensation field to the second-order correction coil assembly asynchronously with at least one gradient field by the gradient coil assembly; and controlling application of a trigger pulse to define a timing of applying the compensation field.

17. The method of claim 16, wherein instructing the MR system further comprises:

instructing the MR system to apply the compensation field having a different timing from a timing of the at least one gradient field.

18. The method of claim 16, wherein instructing the MR system further comprises:

instructing the MR system to apply the compensation field that has a different waveform from a waveform of the at least one gradient field.

19. The method of claim 16, wherein the first second-order correction coil is a $z^2-(x^2+y^2)/2$ correction coil, and the method further comprises:

correcting residual phase errors caused by the second-order concomitant fields by taking account of an $x^2$ spatial variation and a $y^2$ spatial variation in the compensation field generated by the first second-order correction coil.

* * * * *